US012282134B2

(12) United States Patent
Fujii et al.

(10) Patent No.: US 12,282,134 B2
(45) Date of Patent: Apr. 22, 2025

(54) DETECTING DEVICE AND STEERING WHEEL

(71) Applicant: KABUSHIKI KAISHA TOKAI-RIKA-DENKI-SEISAKUSHO, Aichi-ken (JP)

(72) Inventors: Takahiro Fujii, Aichi (JP); Hiroshi Ohira, Aichi (JP); Yasumasa Kondo, Aichi (JP); Hiroshi Takeoka, Aichi (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 203 days.

(21) Appl. No.: 17/959,692

(22) Filed: Oct. 4, 2022

(65) Prior Publication Data
US 2023/0115493 A1 Apr. 13, 2023

(30) Foreign Application Priority Data

Oct. 8, 2021 (JP) ................................. 2021-166456

(51) Int. Cl.
*G01V 3/08* (2006.01)
*B62D 1/06* (2006.01)

(52) U.S. Cl.
CPC .............. *G01V 3/088* (2013.01); *B62D 1/06* (2013.01)

(58) Field of Classification Search
CPC ............. B62D 1/06; H03K 2217/9602; H03K 2017/9602; H03K 17/962
See application file for complete search history.

(56) References Cited

U.S. PATENT DOCUMENTS

| 8,189,300 B1 * | 5/2012 | Bonin | G01D 5/2417 360/290 |
| 2010/0026532 A1 | 2/2010 | Shimizu et al. | |
| 2011/0101997 A1 * | 5/2011 | Gulbranson | G01N 9/36 324/663 |
| 2012/0063133 A1 | 3/2012 | Takeuchi et al. | |
| 2012/0249452 A1 | 10/2012 | Kitano et al. | |
| 2015/0195922 A1 | 7/2015 | Yasuda | |

(Continued)

FOREIGN PATENT DOCUMENTS

| JP | 2011034042 A | 2/2011 |
| JP | 2012208857 A | 10/2012 |

(Continued)

OTHER PUBLICATIONS

Japanese Office Action (w/ English translation) for corresponding Application No. 2021-166456, dated Feb. 18, 2025, 18 pages.

*Primary Examiner* — Farhana A Hoque
(74) *Attorney, Agent, or Firm* — Dority & Manning, P.A.

(57) ABSTRACT

There is disclosed a detecting device including a detecting portion that detects contact of a person with a contacted body, the detecting portion including: an insulating body, the insulating body being sheet-shaped; an electrode, the electrode being sheet-shaped, being disposed at at least one side surface side of the insulating body, and being less extensible than the insulating body; and a positioning hole, the positioning hole being formed so as to penetrate through the insulating body and the electrode, and the insulating body and the electrode being positioned by the positioning hole.

5 Claims, 10 Drawing Sheets

(56) References Cited

U.S. PATENT DOCUMENTS

| | | | |
|---|---|---|---|
| 2021/0206418 A1* | 7/2021 | Nakano | G01V 3/088 |
| 2021/0276604 A1* | 9/2021 | Kondo | B62D 1/046 |
| 2021/0300454 A1* | 9/2021 | Hotta | B62D 1/06 |
| 2022/0190496 A1 | 6/2022 | Watanabe et al. | |

FOREIGN PATENT DOCUMENTS

| | | |
|---|---|---|
| JP | 2013131526 A | 7/2013 |
| JP | 2015012072 A | 1/2015 |
| JP | 2015133342 A | 7/2015 |
| JP | 2021018692 | 2/2021 |
| WO | WO2008132930 A1 | 11/2008 |
| WO | WO2020218520 A1 | 10/2020 |

\* cited by examiner

DETECTING DEVICE AND STEERING WHEEL

CROSS-REFERENCE TO RELATED APPLICATION

This application is based on and claims priority under 35 USC 119 from Japanese Patent Application No. 2021-166456 filed on Oct. 8, 2021, the disclosure of which is incorporated by reference herein.

BACKGROUND

Technical Field

The present disclosure relates to a detecting device and a steering wheel.

Related Art

It is known that vehicles such as automobiles and the like have sensors that detect contact of the hands of a vehicle occupant with the steering wheel (see, for example, Japanese Patent Application Laid-Open (JP-A) No. 2021-18692).

JP-A No. 2021-18692 discloses a technique in which an electrostatic capacitance sensor has a foam sheet that is foamed and has an obverse and a reverse surface, and an electrostatic capacitance sensor electrode disposed at the obverse of the foam sheet.

When positioning a foam sheet at a sensor such as an electrostatic capacitance sensor or the like, it is easy for the foam sheet to deform, and there is therefore the possibility that the foam sheet and the sensor electrode will not be able to be positioned.

SUMMARY

In view of the above-described circumstances, an object of the present disclosure is to obtain a detecting device and a steering wheel at which an insulating body and an electrode can be positioned.

A detecting device of a first aspect of the present disclosure includes a detecting portion that detects contact of a person with a contacted body, the detecting portion including: an insulating body, the insulating body being sheet-shaped; an electrode, the electrode being sheet-shaped, being disposed at at least one side surface side of the insulating body, and being less extensible than the insulating body; and a positioning hole, the positioning hole being formed so as to penetrate through the insulating body and the electrode, and the insulating body and the electrode being positioned by the positioning hole.

In a detecting device of a second aspect of the present disclosure, in the detecting device of the first aspect of the present disclosure, the electrode has a first electrode disposed at one side surface side of the insulating body, and a second electrode disposed at another side surface side of the insulating body, and the positioning hole is formed in the first electrode at further toward an outer side than the second electrode.

In a detecting device of a third aspect of the present disclosure, in the detecting device of the second aspect of the present disclosure, the positioning hole is also formed in the second electrode, further toward an outer side than the first electrode.

In a detecting device of a fourth aspect of the present disclosure, in the detecting device of any one of the first aspect through the third aspect of the present disclosure, the positioning holes are formed at two places in the electrode.

In a detecting device of a fifth aspect of the present disclosure, in the detecting device of the fourth aspect of the present disclosure, one of the positioning holes is formed at one side of the electrode, and another of the positioning holes is formed at another side of the electrode.

A steering wheel of a sixth aspect of the present disclosure includes: the detecting device of any one of the first aspect through the fifth aspect of the present disclosure; a rim core on which the detecting portion is wound; and a decorative member covering the detecting portion wound on the rim core.

In the detecting device of the first aspect of the present disclosure, the positioning hole is provided so as to penetrate through the insulating body and the electrode that is less extensible than the insulating body. Therefore, the insulating body and the electrode can be positioned by the insulating hole.

In the detecting device of the second aspect of the present disclosure, due to the positioning hole being formed in the first electrode at further toward the outer side than the second electrode, the positioning hole is formed in a place where the second electrode is not disposed. Therefore, the first electrode and the second electrode short-circuiting can be suppressed.

In the detecting device of the third aspect of the present disclosure, due to the positioning hole being formed in the second electrode at further toward the outer side than the first electrode, the positioning hole is formed in a place where the first electrode is not disposed. Therefore, the first electrode and the second electrode short-circuiting can be suppressed.

In the detecting device of the fourth aspect of the present disclosure, due to positioning holes being provided at two places, the insulating body and the electrode are positioned by the two positioning holes that are formed so as to penetrate through the insulating body and the electrode that is less extensible than the insulating body. Therefore, the insulating body and the electrode can be positioned closer to the target positions.

In the detecting device of the fifth aspect of the present disclosure, due to one positioning hole being formed at one side of the electrode and the another positioning hole being formed at the another side of the electrode, positioning holes are formed at both sides of the electrode. Therefore, the insulating body and the electrode can be positioned closer to the target positions.

In the steering wheel of the sixth aspect of the present disclosure, due to the insulating body and the electrode being positioned, the insulating body and the electrode are positioned at correct positions, and the desired detecting portion is manufactured. Therefore, the detecting portion can be wound onto a desired position of the rim core, and the steering wheel that has good operability can be provided.

BRIEF DESCRIPTION OF THE DRAWINGS

Exemplary embodiments of the present disclosure will be described in detail based on the following figures, wherein.

DETAILED DESCRIPTION

Figure 1:
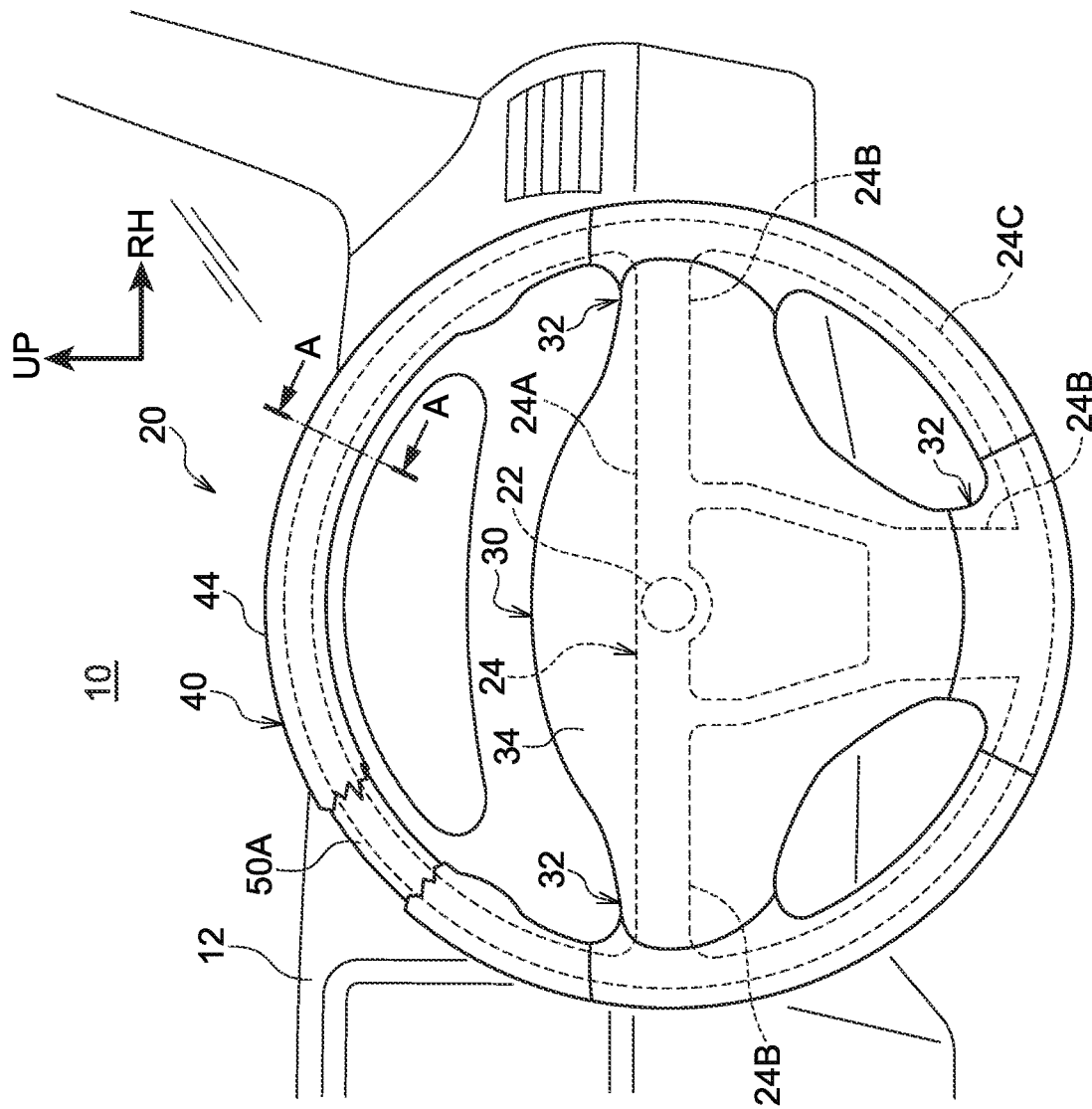
FIG. 1 is a front view illustrating a steering wheel relating to a present embodiment.

A detecting device and a steering wheel relating to present embodiments are described hereinafter with reference to the drawings. The present embodiments describe an example in which a detecting portion that structures a detecting device 50 of the present disclosure is provided at a steering wheel 20, which serves as a contacted body, of a vehicle 10, and is structured as electrostatic capacitance sensors (hereinafter called sensors) 50A that detect contact of a person.

Note that, in the drawings, the front side of the steering wheel 20 is indicated by arrow FR, the right side of the steering wheel 20 is indicated by arrow RH, and the upper side of the steering wheel 20 is indicated by arrow UP. Further, in the drawings, the thickness direction of the sensor 50A is indicated by arrow D, the longitudinal direction of the sensor 50A is indicated by arrow L, and the width direction of the sensor 50A is indicated by arrow

[Structure of Steering Wheel]

As illustrated in FIG. 1, the steering wheel 20 relating to the present embodiment is disposed at the vehicle rear side of an instrument panel 12 provided at the front side of the interior of the cabin of the vehicle 10. The steering wheel 20 is provided in a posture in which the front surface thereof is directed toward the vehicle rear side. The vehicle 10 is steered by the driver, who is seated in the driver's seat, operating the steering wheel 20.

The steering wheel 20 has a rim portion 40 formed in an annular shape, a boss portion 30 disposed at the radial direction inner side of the rim portion 40, and three spoke portions 32 connecting the rim portion 40 and the boss portion 30.

The rim portion 40 is formed in an annular shape as seen in a front view of the steering wheel 20, and is grasped by the driver seated in the driver's seat at the time when the driver steers the vehicle 10. The boss portion 30 is disposed at the substantial center of the steering wheel 20 as seen in a front view of the steering wheel 20. The spoke portions 32 are formed so as to extend rightward, leftward and downward from the boss portion 30 toward the rim portion 40.

As illustrated in FIG. 1, a core 24, which is made of metal and serves as a frame member, is provided at the steering wheel 20. The core 24 has a boss core 24A of the boss portion 30, spoke cores 24B of the spoke portions 32, and a rim core 24C of the rim portion 40.

Figure 3:
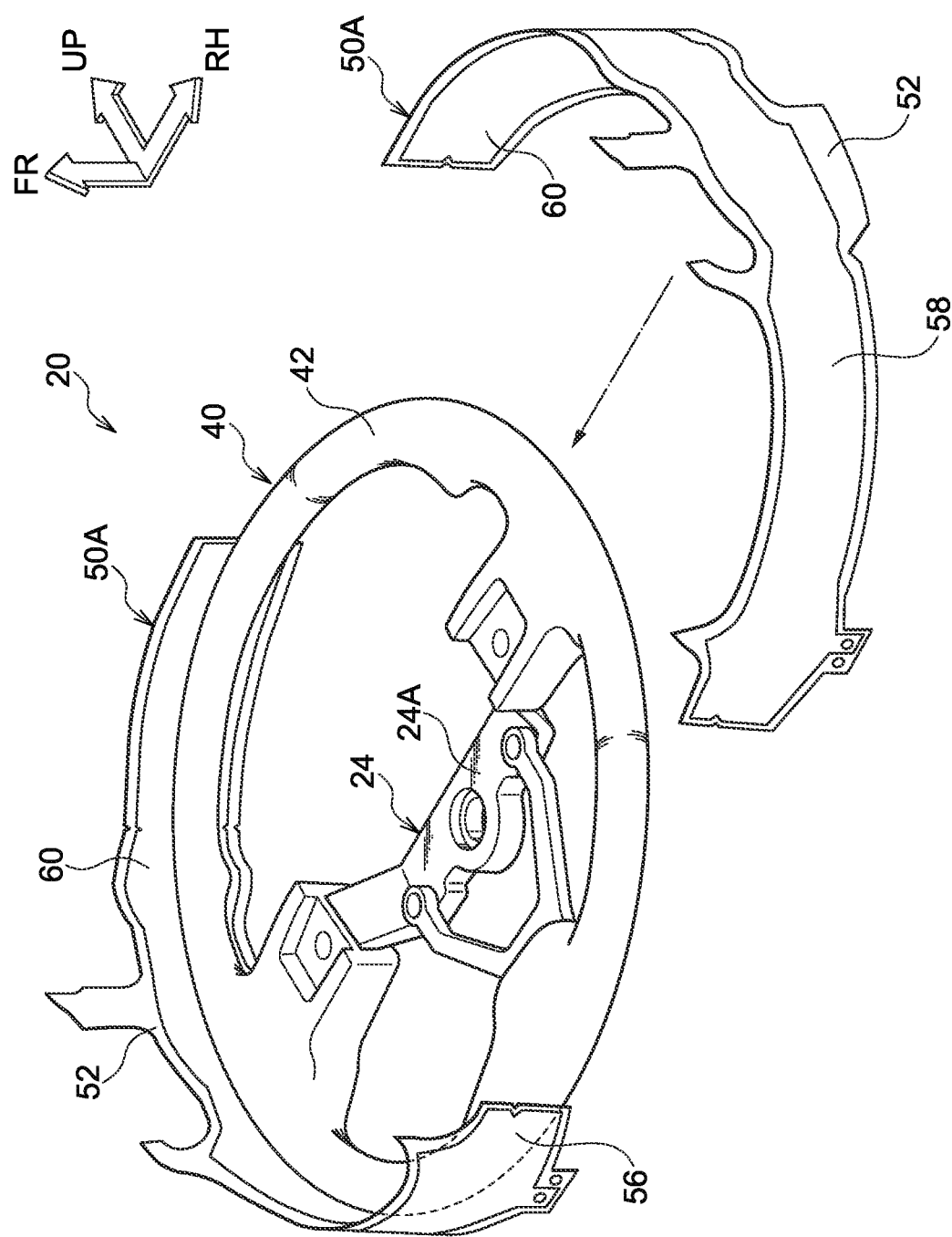
FIG. 3 is an exploded perspective view in which the steering wheel relating to the present embodiment is seen from an obliquely front right side.

As illustrated in FIG. 1 and FIG. 3, the boss core 24A is formed in the shape of a plate, and is fixed to the distal end of a steering shaft 22 that is connected to an unillustrated steering mechanism. The boss core 24A forms the frame of the boss portion 30.

Figure 2:
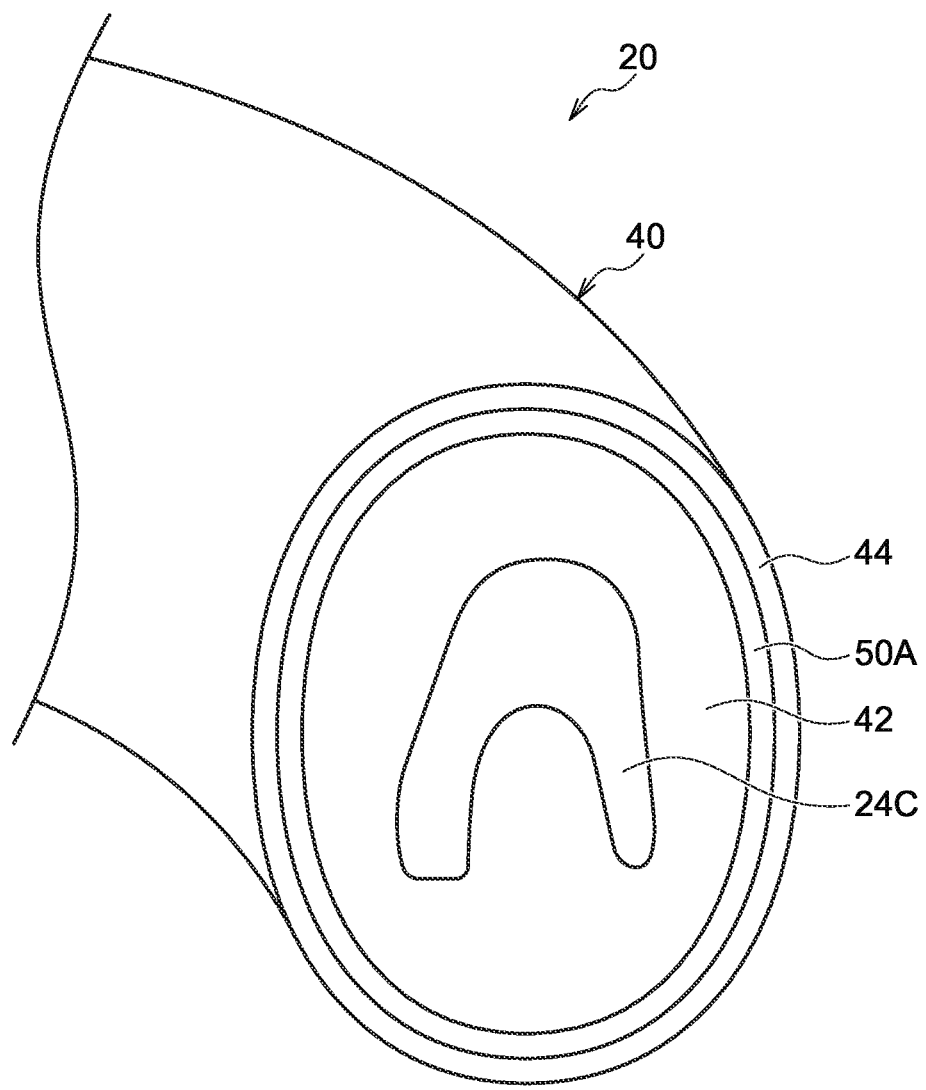
FIG. 2 is a cross-sectional view illustrating the steering wheel relating to the present embodiment, and illustrates the cross-section along line A-A of FIG. 1.

As illustrated in FIG. 1, the rim core 24C is formed in an annular shape as seen in a front view of the steering wheel 20. As illustrated in FIG. 2, in a cross-section in the radial direction of the rim core 24C (the cross-section along line A-A of FIG. 1), the rim core 24C is formed in a substantial U-shape. The rim core 24C forms the frame of the rim portion 40.

As illustrated in FIG. 1, the spoke cores 24B are formed in the shapes of plates, and connect the boss core 24A and the rim core 24C. The spoke cores 24B form the frames of the spoke portions 32.

A covering member 34 is mounted to the boss core 24A and the spoke cores 24B. The covering member 34 can be made of resin. The covering member 34 is formed so as to cover the front sides of the boss core 24A and the spoke cores 24B.

The steering wheel 20 is supported so as to be able to rotate integrally with the steering shaft 22. The steering shaft 22 is rotated, and the vehicle 10 is steered, due to the driver who is seated in the driver's seat grasping the rim portion 40 and rotatingly operating the steering wheel 20 in the peripheral direction of the steering wheel 20.

(Rim Portion)

As illustrated in FIG. 2, the rim portion 40 has the rim core 24C, an inner member 42, the sensors 50A and a skin 44 that serves as a decorative member.

The inner member 42 is made of a soft resin (e.g., is made of polyurethane), and is formed so as to cover the entire outer periphery of the rim core 24C. The inner member 42 is formed so as to cover the entire periphery of the rim core 24C, in a cross-section in the radial direction of the rim core 24C. The outer shape of the inner member 42 is formed to be substantially circular, in a cross-section in the radial direction of the rim core 24C.

As illustrated in FIG. 2 and FIG. 3, the sensors 50A are formed in the shapes of sheets, and are wound on the inner member 42 from the outer periphery (the outer peripheral edge) toward the inner peripheral (the inner peripheral edge) of the inner member 42.

As illustrated in FIG. 2, the skin 44 is covered on the entire outer periphery of the rim portion 40, so as to cover the sensors 50A.

[Structure of Sensors]

As illustrated in FIG. 3, the sensors 50A are disposed respectively at the right side portion and the left side portion of the rim portion 40. The sensor 50A disposed at the right side portion of the rim portion 40 and the sensor 50A disposed at the left side portion of the rim portion 40 have similar structures other than being formed symmetrically to the left and the right, and therefore, the sensor 50A disposed at the right side portion of the rim portion 40 is described hereinafter.

Figure 4:
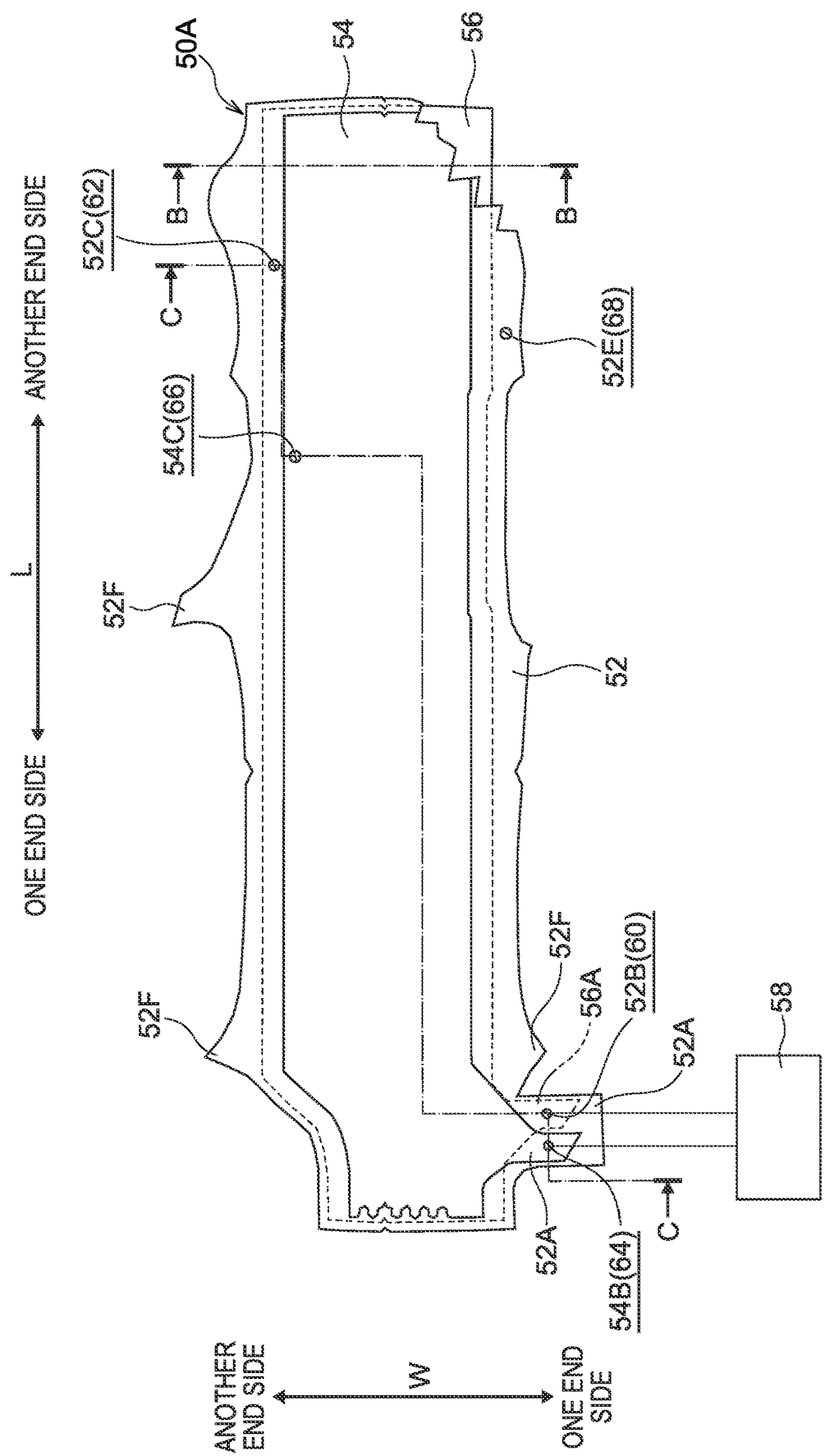
FIG. 4 is an expanded view in which a detecting device relating to the present embodiment is seen from an obverse side.
Figure 5:
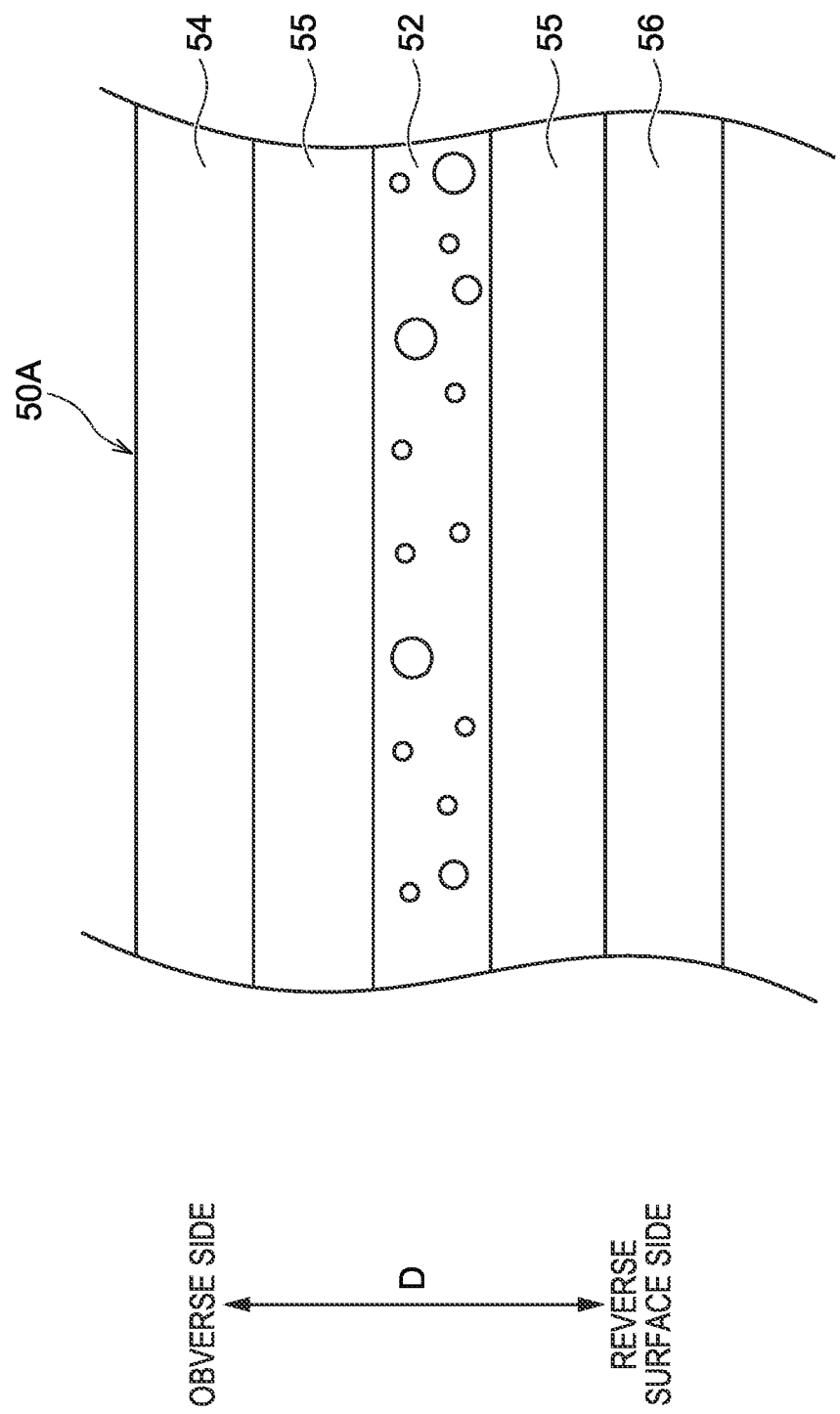
FIG. 5 is a cross-sectional view schematically illustrating a detecting portion relating to the present embodiment, and illustrates the cross-section along line B-B of FIG. 4.

As illustrated in FIG. 4, the sensor 50A is formed in the shape of a substantially rectangular, elongated sheet. As illustrated in FIG. 4 and FIG. 5, the sensor 50A has a foam body 52 serving as a first insulating body (an example of the insulating body), a cancel electrode 56 disposed at the reverse surface side of the foam body 52 and serving as a first electrode (an example of the electrode), a sensor electrode 54 disposed at the obverse side of the foam body 52 and serving as a second electrode (an example of the electrode), and hot melt bodies 55 serving as an example of a second insulating body (an example of the insulating body).

(Foam Body)

Figure 8A:
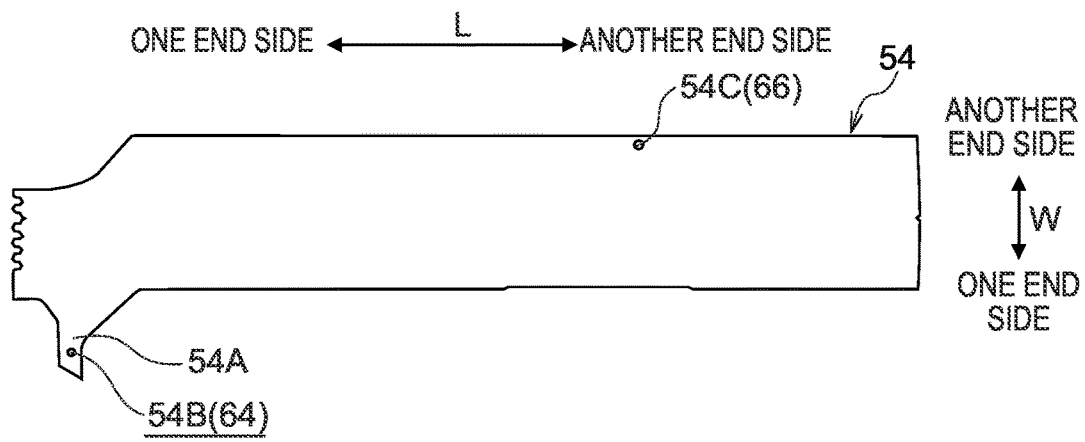
FIG. 8A is an expanded view illustrating parts structuring the detecting portion that has been cut by the cutting process relating to the present embodiment, and is a drawing illustrating a sensor electrode in particular.
Figure 8B:
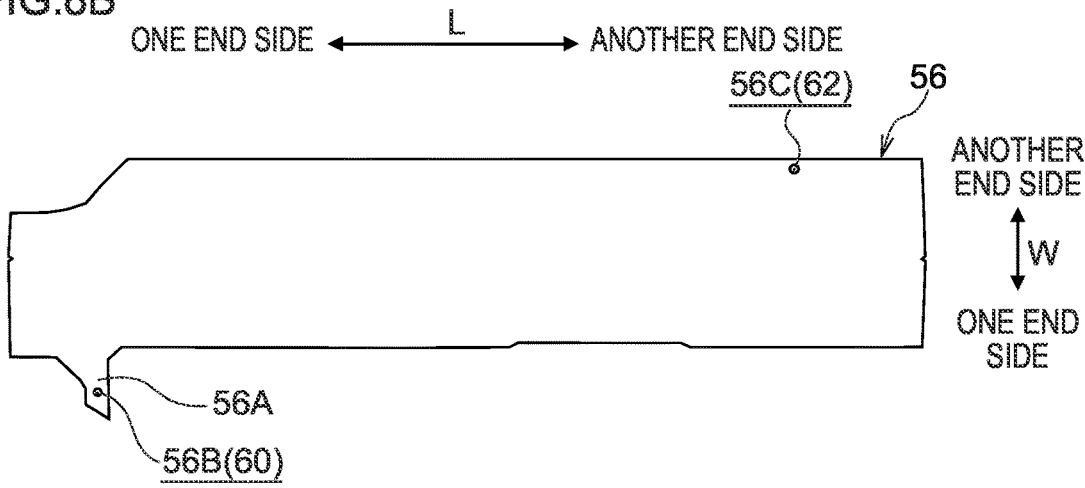
FIG. 8B is an expanded view illustrating parts structuring the detecting portion that has been cut by the cutting process relating to the present embodiment, and is a drawing illustrating a cancel electrode in particular.
Figure 8C:
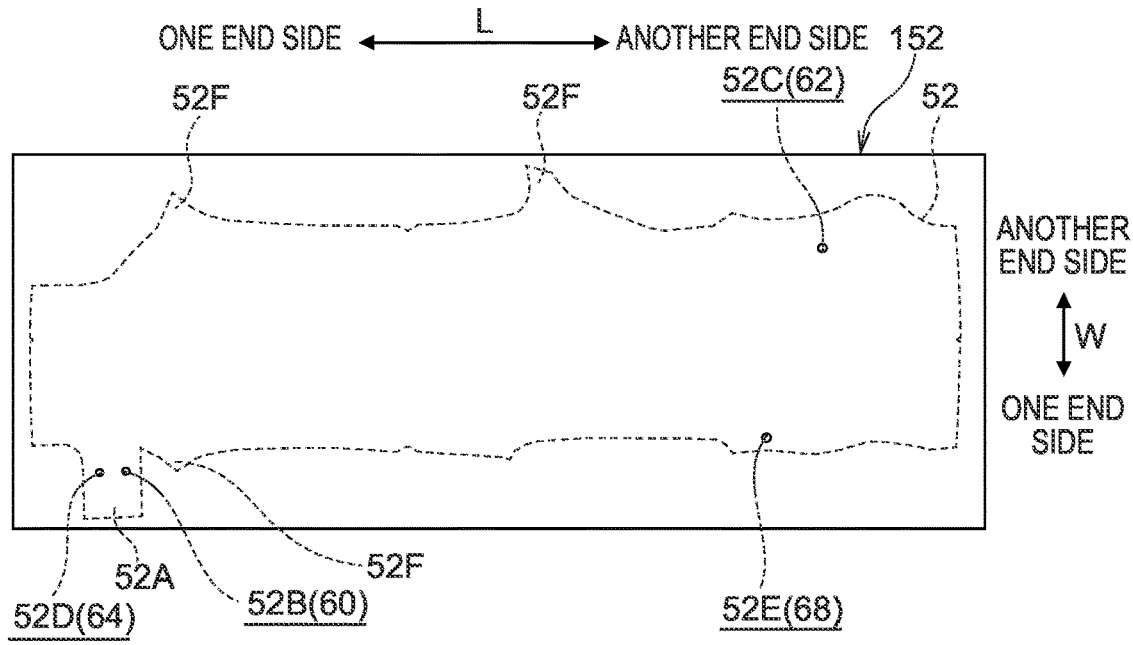
FIG. 8C is an expanded view illustrating parts structuring the detecting portion that has been cut by the cutting process relating to the present embodiment, and is a drawing illustrating a foam body in particular.

As illustrated in FIG. 4, FIG. 5 and FIG. 8C, the foam body 52 is formed in the shape of a substantially rectangular, elongated sheet. The foam body 52 can be made to be an elastically extensible foam body (e.g., a foam rubber). The foam body 52 has the property of being more extensible than the cancel electrode 56 and the sensor electrode 54. The foam body 52 is formed of a material that is electrically insulating. The foam body 52 electrically insulates the sensor electrode 54 and the cancel electrode 56.

The foam body 52 is formed by a molded product (a mass) that has been foam-molded being sliced and formed to a predetermined thickness e.g., around 1 Numerous air bubbles are formed in the foam body 52.

<Projecting Portions>

As illustrated in FIG. 4 and FIG. 8C, plural projecting portions 52F that project toward the outer side in the in-plane direction are formed at the peripheral edge of the foam body 52. Due thereto, due to a worker pulling the projecting portions 52F at the time of winding the sensor 50A onto the inner member 42, the sensor 50A is stretched, and the sensor 50A can be made to be easy to wind onto the inner member 42.

[Extending Portion]

As illustrated in FIG. 4 and FIG. 8C, an extending portion 52A, which extends out toward the outer side in the in-plane direction from the outer peripheral edge of one end in the width direction W in a vicinity of one end in the longitudinal direction L of the foam body 52, is formed at the foam body 52.

(Sensor Electrode)

As illustrated in FIG. 4 and FIG. 5, the sensor electrode 54 is formed in the shape of a substantially rectangular, elongated sheet and is smaller sized than the foam body 52, and is disposed at the obverse side of the foam body 52. The sensor electrode 54 is provided further toward the inner side in the in-plane direction than the outer peripheral edge of the foam body 52. The sensor electrode 54 is provided further toward the inner side in the in-plane direction than the outer peripheral edge of the cancel electrode 56, at portions other than a first extending portion 54A that is described later.

The sensor electrode 54 can be an electrically conductive fabric that is electrically conductive and at which metal plating processing is carried out on the obverse of an extensible, fiber fabric. The sensor electrode 54 has the property of being less extensible than the foam body 52. The first extending portion 54A, which extends out toward the outer side in the in-plane direction from the outer peripheral edge of the one end in the width direction W in a vicinity of the one end in the longitudinal direction L of the sensor electrode 54, is formed at the sensor electrode 54.

(Cancel Electrode)

As illustrated in FIG. 4 and FIG. 5, the cancel electrode 56 is formed in the shape of a substantially rectangular, elongated sheet and is smaller sized than the foam body 52 and larger sized than the sensor electrode, and is disposed at the reverse surface side of the foam body 52. The cancel electrode 56 is provided further toward the inner side in the in-plane direction than the outer peripheral edge of the foam body 52. The cancel electrode 56 is provided further toward the outer side in the in-plane direction than the outer peripheral edge of the sensor electrode 54, at portions other than the first extending portion 54A.

The cancel electrode 56 can be an electrically conductive fabric that is electrically conductive and at which metal plating processing is carried out on the obverse of an extensible, fiber fabric. The cancel electrode 56 has the property of being less extensible than the foam body 52. A second extending portion 56A, which extends out toward the outer side in the in-plane direction from the outer edge of the vicinity of the one end in the width direction W in a vicinity of the one end in the longitudinal direction L of the cancel electrode 56, is formed at the cancel electrode 56.

(Hot Melt Bodies)

As illustrated in FIG. 5, the hot melt bodies 55 are interposed between the sensor electrode 54 and the foam body 52, and between the cancel electrode 56 and the foam body 52. The hot melt bodies 55 are formed by a hot melt material that is electrically insulating.

(Terminals)

As illustrated in FIG. 4, a first terminal made of metal is provided at the first extending portion 54A of the sensor electrode 54. This first terminal is formed by the first extending portion 54A of the sensor electrode 54 and the extending portion 52A of the foam body 52 being riveted and caulked in a state of being affixed to one another. This first terminal structures a third positioning hole 64 that is described later. The first terminal is electrically connected to a control device 58 (ECU).

A second terminal made of metal is provided at the second extending portion 56A of the cancel electrode 56. This second terminal is formed by the second extending portion 56A of the cancel electrode 56 and the extending portion 52A of the foam body 52 being riveted and caulked in a state of being affixed to one another. This second terminal structures a first positioning hole 60 that is described later. The second terminal is electrically connected to the control device 58 (ECU). The sensors 50A and the control device 58 structure the detecting device 50. Note that the control device 58 may be provided at the steering wheel 20, or may be provided at another part.

[Structures of Positioning Holes]

As illustrated in FIG. 4, the sensor 50A has the first positioning hole 60 serving as a positioning hole, a second positioning hole 62 serving as a positioning hole, the third positioning hole 64 serving as a positioning hole, a fourth positioning hole 66, and a fifth positioning hole 68.

(First Positioning Hole)

As illustrated in FIG. 4, FIG. 8B and FIG. 8C, the first positioning hole 60 is formed in a vicinity of the one ends in the longitudinal direction L of the cancel electrode 56 and the foam body 52, in a vicinity of the one ends in the width direction W. The first positioning hole 60 is formed in a vicinity of corner portions of the cancel electrode 56 and the foam body 52 that are formed in the shapes of substantially rectangular, elongated sheets. The first positioning hole 60 is provided further toward the outer side in the in-plane direction than the outer edge of the sensor electrode 54.

The first positioning hole 60 is structured by a first cancel electrode through-hole 56B provided in the cancel electrode 56 and serving as an electrode through-hole, and a first foam body through-hole 52B provided in the foam body 52 and serving as an insulating body through-hole.

The first cancel electrode through-hole 56B is formed in the second extending portion 56A as a through-hole that penetrates through in the thickness direction of the cancel electrode 56. The first cancel electrode through-hole 56B can be a circular through-hole of a predetermined diameter (e.g., around 3 mm).

The first foam body through-hole 52B is formed in the extending portion 52A as a through-hole that penetrates through in the thickness direction of the foam body 52. The first foam body through-hole 52B can be a circular through-hole of the same size as the first cancel electrode through-hole 56B. The first foam body through-hole 529 is formed as a through-hole that is connected with the first cancel electrode through-hole 56B. The first foam body through-hole 52B is formed at the same position in the longitudinal direction L and the width direction W as the first cancel electrode through-hole 569.

(Second Positioning Hole)

As illustrated in FIG. 4, FIG. 813 and FIG. 8C, the second positioning hole 62 is formed in a vicinity of the another ends in the longitudinal direction L of the cancel electrode 56 and the foam body 52, in a vicinity of the another ends in the width direction W. The second positioning hole 62 is formed in a vicinity of corner portions of the cancel electrode 56 and the foam body 52 that are formed in the shapes of substantially rectangular, elongated sheets, which corner portions are diagonally opposite the corner portions in which the first positioning hole 60 is formed. The second positioning hole 62 is provided further toward the outer side in the in-plane direction than the outer edge of the sensor electrode 54.

The second positioning hole 62 is structured by a second cancel electrode through-hole 56C provided in the cancel electrode 56 and serving as an electrode through-hole, and a second foam body through-hole 52C provided in the foam body 52 and serving as an insulating body through-hole.

The second cancel electrode through-hole 56C is formed as a through-hole that penetrates through in the thickness direction of the cancel electrode 56. The second cancel electrode through-hole 56C can be a circular through-hole of a predetermined diameter (e.g., around 3 min).

The second foam body through-hole 52C is formed as a through-hole that penetrates through in the thickness direction of the foam body 52. The second foam body through-hole 52C can be a circular through-hole of the same size as the second cancel electrode through-hole 56C. The second cancel electrode through-hole 56C and the second foam body through-hole 52C can also be through-holes that are shaped as long holes (that are oval). The second foam body through-hole 52C is foil led as a through-hole that is connected with the second cancel electrode through-hole 56C. The second foam body through-hole 52C is formed at the same position in the longitudinal direction L and the width direction W as the second cancel electrode through-hole 56C.

(Third Positioning Hole)

As illustrated in FIG. 4, FIG. 8A and FIG. 8C, the third positioning hole 64 is formed in a vicinity of the one ends in the longitudinal direction L of the sensor electrode 54 and the foam body 52, in a vicinity of the one ends in the width direction W. The third positioning hole 64 is formed in a vicinity of corner portions of the sensor electrode 54 and the foam body 52 that are formed in the shapes of substantially rectangular, elongated sheets. The third positioning hole 64 is provided further toward the outer side in the in-plane direction than the outer edge of the cancel electrode 56.

The third positioning hole 64 is structured by a first sensor electrode through-hole 54B provided in the sensor electrode 54, and a third foam body through-hole 52D provided in the foam body 52.

The first sensor electrode through-hole 54B is formed in the first extending portion 54A as a through-hole that penetrates through in the thickness direction of the sensor electrode 54. The first sensor electrode through-hole 54B can be a circular through-hole of a predetermined diameter (e.g., around 3 mm).

The third foam body through-hole 52D is formed in the extending portion 52A as a through-hole that penetrates through in the thickness direction of the foam body 52. The third foam body through-hole 52D can be a circular through-hole of the same size as the first sensor electrode through-hole 54B. The third foam body through-hole 52D is formed as a through-hole that is connected with the first sensor electrode through-hole 54B. The third foam body through-hole 52D is formed at the same position in the longitudinal direction L and the width direction W as the first sensor electrode through-hole 54B.

(Fourth Positioning Hole)

As illustrated in FIG. 4 and FIG. 8A, the fourth positioning hole 66 is formed further toward the one end side in the longitudinal direction L than the second positioning hole 62, in a vicinity of the another end in the width direction W. The fourth positioning hole 66 can be provided in a vicinity of the longitudinal direction L center of the sensor electrode 54 that is formed in the shape of a substantially rectangular, elongated sheet. The fourth positioning hole 66 is provided in a vicinity of the outer edge of the sensor electrode 54.

The fourth positioning hole 66 is structured by a second sensor electrode through-hole 54C provided in the sensor electrode 54.

The second sensor electrode through-hole 54C is formed as a through-hole that penetrates through in the thickness direction of the sensor electrode 54. The second sensor electrode through-hole 54C can be a circular through-hole of a predetermined diameter (e.g., around 3 mm). The second sensor electrode through-hole 54C can also be a through-hole that is shaped as a long hole (that is oval).

(Fifth Positioning Hole)

As illustrated in FIG. 4 and FIG. 8C, the fifth positioning hole 68 is formed further toward the one end side in the longitudinal direction L than the second positioning hole 62, in a vicinity of the one end in the width direction W. The fifth positioning hole 68 is provided in a vicinity of the outer edge of the foam body 52.

The fifth positioning hole 68 is structured by a fourth foam body through-hole 52E provided in the foam body 52.

The fourth foam body through-hole 52E is formed as a through-hole that penetrates through in the thickness direction of the foam body 52. The fourth foam body through-hole 52E can be a circular through-hole of a predetermined diameter (e.g., around 3 mm). The fourth foam body through-hole 52E can also be a through-hole that is shaped as a long hole (that is oval).

[Method of Manufacturing Sensor]

Figure 6:
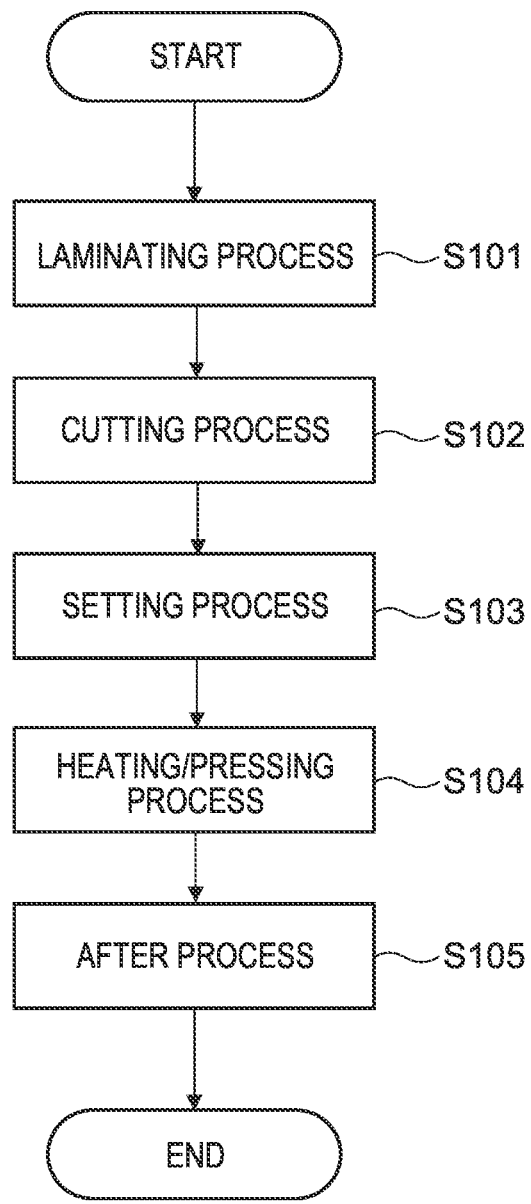
FIG. 6 is a flow diagram illustrating processes of manufacturing the detecting portion relating to the present embodiment.

As illustrated in FIG. 6, the sensor 50A is manufactured through a laminating process (step S101), a cutting process (step S102), a setting process (step S103), a heating/pressing process (step S104), and an after process (step S105).

(Laminating Process)

Figure 7:
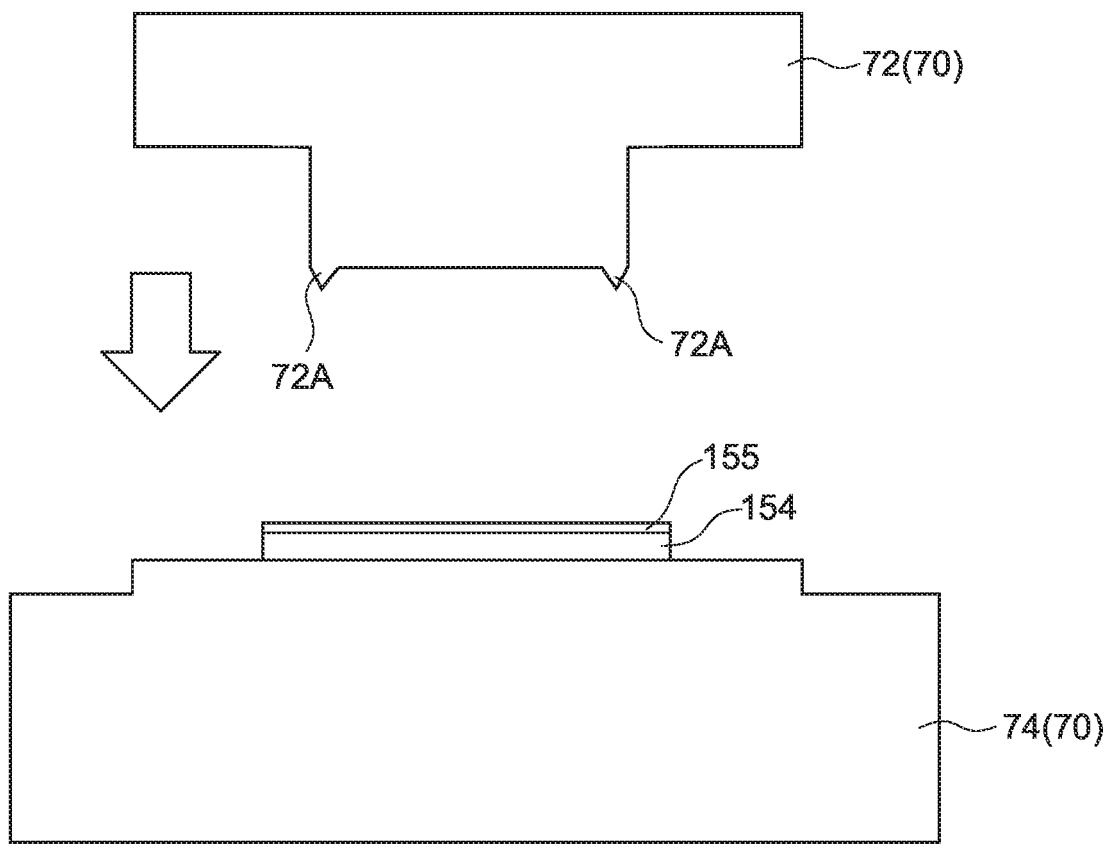
FIG. 7 is a cross-sectional view illustrating a cutting process relating to the present embodiment.

In the laminating process (step S101), as illustrated in FIG. 7, a hot melt sheet 155, which is shaped as a rectangular, elongated sheet and forms the hot melt body 55, is affixed on one side surface of a sensor electrode sheet 154 that is shaped as a rectangular, elongated sheet and forms the sensor electrode 54.

Further, the hot melt sheet 155, which is shaped as a rectangular, elongated sheet and forms the hot melt body 55, is affixed on one side surface of a cancel electrode sheet (not illustrated) that is shaped as a rectangular, elongated sheet and forms the cancel electrode 56, at one side surface of the cancel electrode 56.

(Cutting Process)

In the cutting process (step S102), as illustrated in FIG. 7, the sensor electrode sheet 154 to which the hot melt sheet 155 has been affixed is set on a press machine 70 formed from an upper mold 72 having cutting blades 72A, and a lower mold 75. The sensor electrode 54, which is the desired shape and to which the hot melt sheet 155 is affixed, is formed by shearing processing. Further, the first sensor electrode through-hole 54B and the second sensor electrode through-hole 54C are formed by punching processing in the sensor electrode 54 to which the hot melt sheet 155 is affixed.

Similarly, the cancel electrode sheet to which the hot melt sheet 155 has been affixed is set at the press machine 70. The cancel electrode 56, which is the desired shape and to which the hot melt sheet 155 is affixed, is formed by shearing processing. Further, the first cancel electrode through-hole 56B and the second cancel electrode through-hole 56C are formed by punching processing in the cancel electrode 56 to which the hot melt sheet 155 is affixed.

Similarly, a foam body sheet 152 (see FIG. 8C) that is shaped as a rectangular, elongated sheet is set at the press machine 70, and the foam body 52 of the desired shape is formed by shearing processing. Further, the first foam body through-hole 52B, the second foam body through-hole 52C, the third foam body through-hole 52D and the fourth foam body through-hole 52E are formed in the foam body 52 by punching processing.

(Setting Process)

Figure 9:
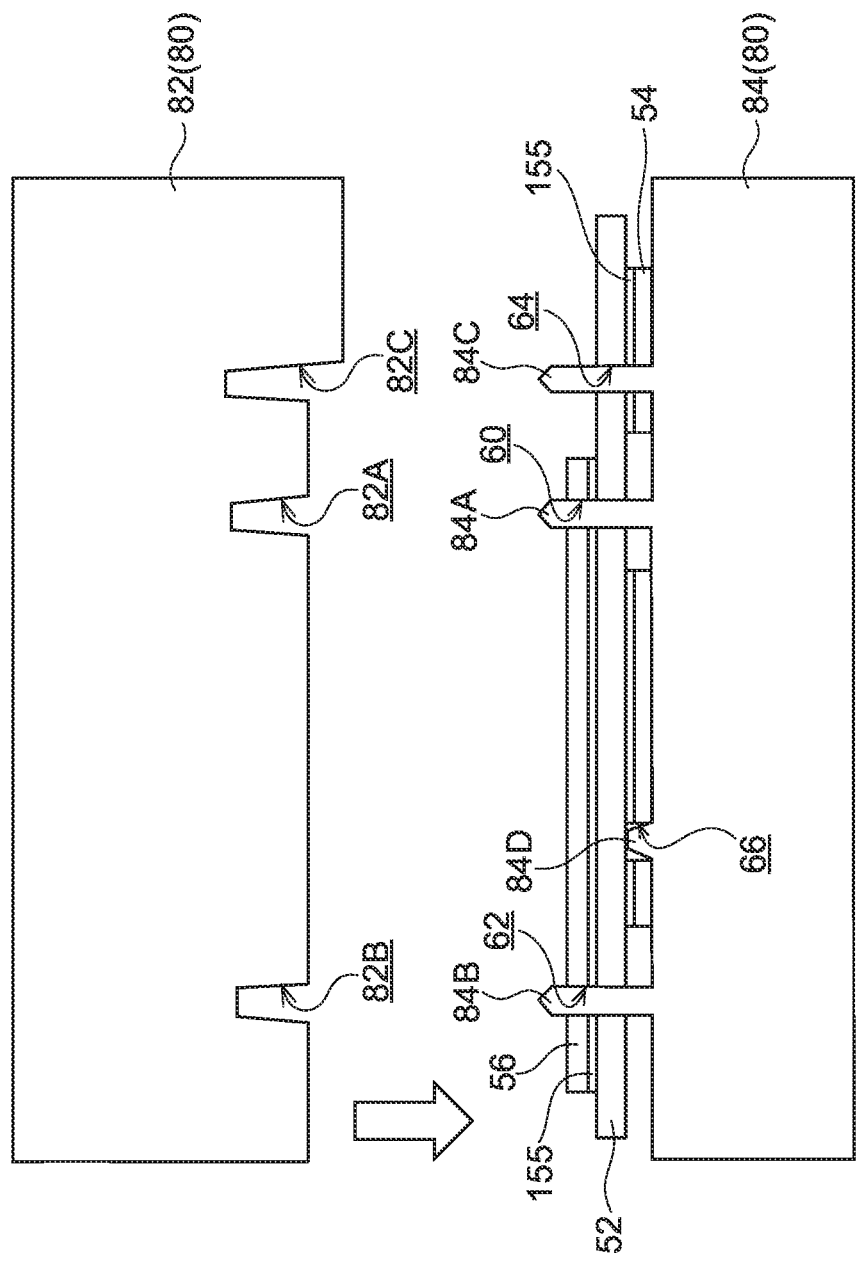
FIG. 9 is a cross-sectional view illustrating a setting process and a heating/pressing process relating to the present embodiment, and illustrates the cross-section along line C-C of FIG. 4.

In the setting process (step S103), as illustrated in FIG. 9, the sensor electrode 54 with the affixed hot melt sheet 155 facing upward, the foam body 52, and the cancel electrode 56 with the affixed hot melt sheet 155 facing downward, are layered in that order, and are set at a heating/pressing machine 80 formed from an upper mold 82 and a lower mold 84.

The lower mold 84 has a first positioning pin 84A that is inserted into the first positioning hole 60, a second positioning pin 84B that is inserted into the second positioning hole 62, a third positioning pin 84C that is inserted into the third positioning hole 64, and a fourth positioning pin 84D that is inserted into the fourth positioning hole 66. The lower mold 84 may have a fifth positioning pin (not illustrated) that is inserted into the fifth positioning hole 68.

The upper mold 82 has a first insertion hole 82A into which the first positioning pin 84A is inserted, a second insertion hole 82B into which the second positioning pin 84B is inserted, and a third insertion hole 82C into which the third positioning pin 84C is inserted. The upper mold 82 may have a fifth insertion hole (not illustrated) into which the fifth positioning pin (not illustrated) is inserted.

At the time when the sensor electrode 54, the foam body 52 and the cancel electrode 56 are set at the heating/pressing machine 80, the first positioning pin 84A is inserted in the first positioning hole 60, the second positioning pin 84B is inserted in the second positioning hole 62, the third positioning pin 84C is inserted in the third positioning hole 64, the fourth positioning pin 84D is inserted in the fourth positioning hole 66, and the sensor electrode 54, the foam body 52 and the cancel electrode 56 are positioned with respect to the heating/pressing machine 80. Note that the fifth positioning pin (not illustrated) may be inserted in the fifth positioning hole 68.

(Heating/Pressing Process)

In the heating/pressing process (step S104), the sensor 50A is manufactured due to the layered body that was set in the setting process (step S103) being heated, the hot melt sheets 155 being fused, and pressure being applied to the layered body in the thickness direction. Note that the temperature at which the heating/pressing machine 80 heats the layered body is set to a temperature at which the hot melt sheets 155 fuse.

(After Process)

Figure 10:
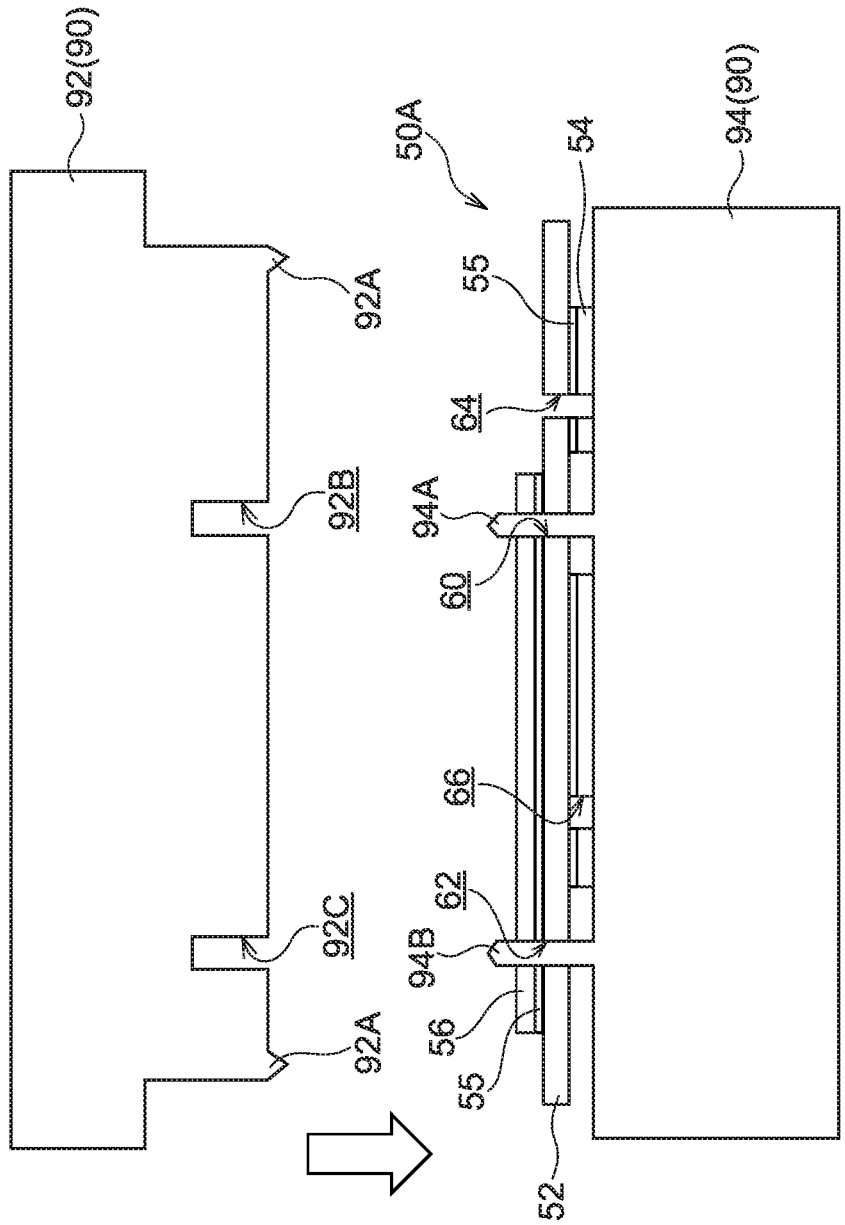
FIG. 10 is a cross-sectional view illustrating an after process relating to the present embodiment, and illustrates the cross-section along line C-C of FIG. 4.

In the after process (step S105), as illustrated in FIG. 10, the sensor 50A that was manufactured in the heating/pressing process (step S104) is set at a press machine 90 that serves as the device used in the after process and that is formed from an upper mold 92, which has cutting blades 92A, and a lower mold 94.

The lower mold 94 has a first positioning pin 94A serving as a positioning pin and inserted into the first positioning hole 60, and a second positioning pin 94B serving as a positioning pin and inserted into the second positioning hole 62.

The upper mold 92 has a first insertion hole 92B into which the first positioning pin 94A is inserted, and a second insertion hole 92C into which the second positioning pin 94B is inserted.

At the time when the sensor 50A is set at the press machine 90, the first positioning pin 94A is inserted into the first positioning hole 60, the second positioning pin 94B is inserted into the second positioning hole 62, and positioning of the sensor 50A with respect to the press machine 90 is carried out. Note that the sensor 50A may be positioned with respect to the press machine 90 by using the first positioning hole 60, the second positioning hole 62, and moreover, the third positioning hole 64.

Further, in the state in which the sensor 50A is positioned with respect to the press machine 90, the upper mold 92 is lowered with respect to the lower mold 94, and the sensor 50A is sheared by the cutting blades 92A, and the sensor 50A of the desired shape is thereby shaped and formed.

[Operation of Present Embodiment]

Operation of the present embodiment is described next.

At the steering wheel 20 of the above-described structure, when a vehicle occupant grasps the rim portion 40 of the steering wheel 20, and a hand of the vehicle occupant contacts the skin 44, at the control device 58, the electrostatic capacity generated between the hand of the vehicle occupant and the sensor electrode 54 is detected, and grasping of the rim portion 40 by the vehicle occupant (contact of the hand with the skin 44) is detected. Further, the sensor electrode 54 and the cancel electrode 56 are controlled to the same potential by the control device 58. Due thereto, parasitic capacitance arising between the sensor electrode 54 and the rim core 24C is limited. Therefore, the electrostatic capacitance that arises between the hand of the vehicle occupant and the sensor electrode 54 varying due to parasitic capacitance between the sensor electrode 54 and the rim core 24C is suppressed, and deterioration of the accuracy of detecting the grasping of the rim portion 40 by the vehicle occupant is suppressed.

The sensor 50A that structures the detecting device 50 of the present embodiment has the sheet-shaped foam body 52, the sheet-shaped cancel electrode 56 that is disposed at the reverse surface side of the foam body 52 and is less extensible than the foam body 52, and the first positioning hole 60 and the second positioning hole 62 that are formed so as to penetrate through the foam body 52 and the cancel electrode 56, and into which the first positioning pin 94A and the second positioning pin 94B of the press machine 90 that is used in the after process are inserted, and by which the foam body 52 and the cancel electrode 56 are positioned.

By providing the first positioning hole 60 and the second positioning hole 62 to penetrate through the foam body 52 and the cancel electrode 56 that is less extensible than the foam body 52, the first positioning pin 94A and the second positioning pin 94B of the press machine 90 used in the after process are inserted into the first positioning hole 60 and the second positioning hole 62, and the foam body 52 and the cancel electrode 56 are positioned. Therefore, the foam body 52 and the cancel electrode 56 can be positioned at the target positions with respect to the press machine 90 that is used in the after process. As a result, the sensor 50A can be positioned accurately.

Moreover, because the first positioning hole 60 and the second positioning hole 62 are provided so as to penetrate through the foam body 52 and the cancel electrode 56, the lengths of the first positioning hole 60 and the second positioning hole 62 in the thickness direction of the sensor 50A are long. As a result, it is difficult for the sensor 50A, into which the first positioning pin 94A and the second positioning pin 94B are inserted, to come away from the first positioning pin 94A and the second positioning pin 94a Therefore, the workability of the after process can be improved.

The sensor 50A that structures the detecting device 50 of the present embodiment has the sheet-shaped sensor electrode 54 that is disposed at the obverse side of the foam body 52, and the first positioning hole 60 and the second positioning hole 62 are formed further toward the outer side than the sensor electrode 54.

By the way, if through-holes that penetrate through the cancel electrode 56 and the sensor electrode 54 are formed in the sensor 50A, there is the possibility that short circuiting will occur between the cancel electrode 56 and the sensor electrode 54 via these through-holes.

In the present embodiment, due to the first positioning hole 60 and the second positioning hole 62 being formed further toward the outer side than the sensor electrode 54, the first positioning hole 60 and the second positioning hole 62 are formed at places where the sensor electrode 54 is not disposed. As a result, the cancel electrode 56 and the sensor electrode 54 short-circuiting can be suppressed.

Moreover, due to the first positioning hole 60 and the second positioning hole 62 being formed further toward the outer side than the sensor electrode 54, the first positioning hole 60 and the second positioning hole 62 are formed at places that have little effect on the detecting of contact by a person. Therefore, the detection accuracy of the detecting device 50 can be maintained.

At the sensor 50A that structures the detecting device 50 of the present embodiment, the third positioning hole 64 is formed further toward the outer side than the cancel electrode 56.

Due to the third positioning hole 64 being formed further toward the outer side than the cancel electrode 56, the third positioning hole 64 is formed at a place at which the cancel electrode 56 is not disposed. As a result, the cancel electrode 56 and the sensor electrode 54 short-circuiting can be suppressed. Further, the sensor 50A can be positioned by the first positioning hole 60, the second positioning hole 62 and the third positioning hole 64 with respect to the press machine 90 that is used in the after process. Therefore, the foam body 52 and the cancel electrode 56 can be positioned even closer to the target positions. As a result, the sensor 50A can be positioned more accurately.

At the sensor 50A that structures the detecting device 50 of the present embodiment, positioning holes are formed at two places.

By providing positioning holes (the first positioning hole 60 and the second positioning hole 62) at two places, the first positioning pin 94A and the second positioning pin 94B are inserted into the first positioning hole 60 and the second positioning hole 62 that are formed so as to penetrate through the foam body 52 and the cancel electrode 56 that is less extensible than the foam body 52, and the foam body 52 and the cancel electrode 56 are positioned. Therefore, the foam body 52 and the cancel electrode 56 can be positioned even closer to the target positions, with respect to the press machine 90 that is used in the after process. As a result, the sensor 50A can be positioned even more accurately.

At the sensor 50A that structures the detecting device 50 of the present embodiment, the one first positioning hole 60 is formed at the one end of the cancel electrode 56, and the another second positioning hole 62 is formed at the another end of the cancel electrode 56.

Due to the first positioning hole 60 being formed at the one end of the cancel electrode 56 and the second positioning hole 62 being formed at the another end of the cancel electrode 56, positioning holes are formed in the both ends of the cancel electrode 56. Therefore, the sensor 50A can be positioned accurately.

Moreover, due to the first positioning hole 60 and the second positioning hole 62 being formed in the both ends of the cancel electrode 56, the positioning holes are formed at places that have little effect on the detecting of contact by a person. Therefore, the detection accuracy of the detecting device 50 can be maintained.

The steering wheel 20 of the present embodiment has the detecting device 50, the rim core 24C on which the sensors 50A are wound, and the skin 44 that covers the sensors 50A wound on the rim core 24C.

By the way, in a case in which the detecting device 50 is provided at the steering wheel 20, the sensors 50A are wound on and attached to the rim core 24C. In such a case, in order to make it such that operation of the steering wheel 20 is not affected, wrinkling and overlapping of the sensors 50A that are wound on the rim core 24C must not occur. Therefore, the sensors 50A are positioned, and the outer shapes of the sensors 50A must be cut to exact sizes, and the resultant forms must be inspected.

At the steering wheel 20 of the present embodiment, the above-described sensor 50A is positioned at the correct position with respect to the press machine 90 that is used in the after process, due to the first positioning pin 94A and the second positioning pin 94B of the press machine 90 used in the after process being inserted into the first positioning hole 60 and the second positioning hole 62, and the foam body 52 and the cancel electrode 56 being positioned. Therefore, the sensor 50A is cut to the target outer shape in the after process. As a result, at the time of winding the sensors 50A onto the rim core 24C, the occurrence of wrinkling and overlapping is suppressed, and operability of the steering wheel 20 can be maintained.

The detecting device and steering wheel of the present disclosure have been described above on the basis of the above embodiments. However, the concrete structures thereof are not limited to the embodiments, and changes in design and the like are permissible provided that they do not depart from the gist of the disclosures relating to the claims.

The above embodiments describe an example in which the cancel electrode 56 is disposed at the reverse surface side of the foam body 52, and the sensor electrode 54 is disposed at the obverse side of the foam body 52. However, the electrodes may be disposed on only one side surface of the foam body.

The above embodiments describe an example in which, at the sensor 50A, the first positioning hole 60 and the second positioning hole 62 are provided as the positioning holes into which are inserted the positioning pins of the device that is used in the after process. However, one positioning hole, or three or more positioning holes, may be provided as the positioning holes into which are inserted the positioning pins of the device used in the after process.

The above embodiments describe an example in which the insulating body is the foam body 52. However the insulating body is not limited to this form, and it suffices for the insulating body to be electrically insulating.

The above embodiments describe an example in which the hot melt body 55 is interposed between the sensor electrode 54 and the foam body 52, and between the cancel electrode 56 and the foam body 52. However, it suffices for a part that has adhesive force (e.g., a double-sided tape) to be interposed between the sensor electrode and the foam body, and between the cancel electrode and the foam body.

Although the above embodiments describe an example in which the cancel electrode 56 and the sensor electrode 54 are structured by electrically conductive fabrics, the cancel electrode and the sensor electrode are not limited to such a form.

Although the above embodiments describe an example in which the first electrode is the cancel electrode 56, and the second electrode is the sensor electrode 54, the first electrode may be the sensor electrode, and the second electrode may be the cancel electrode.

The above embodiments describe an example in which the press machine 90 that shears the sensor 50A is used as the device that is used in the after process. However, the device that is used in the after process is not limited to this form, and can be a machining device that carries out an after processing on the sensor 50A, or a jig device for inspecting the sensor 50A.

The above embodiments describe an example in which the first positioning hole 60 and the second positioning hole 62 are used in positioning in the after process. However, the first positioning hole and the second positioning hole may be used in positioning in a process other than the after process. Further, the third positioning hole 64 and the second positioning hole 62 may be used in positioning in the after process. Or, the first positioning hole 60, the second positioning hole 62 and the third positioning hole 64 may be used in positioning in the after process.

The above embodiments describe an example in which one of the third positioning holes 64, which serves as a positioning hole that is formed to penetrate through the sensor electrode 54 and the foam body 52, is provided. However, two or more positioning holes that are formed to penetrate through the sensor electrode 54 and the foam body 52 may be provided.

The above embodiments describe an example in which the detecting portion that structures the detecting device of the present disclosure is an electrostatic capacitance sensor. However, the detecting portion that structures the detecting device of the present disclosure can be applied to a sensor at which an electrode is disposed at at least one side surface side of an insulating body.

The above embodiments describe an example in which the detecting portion that structures the detecting device of the present disclosure is provided at the rim portion 40 of the steering wheel 20. However, the detecting portion that structures the detecting device of the present disclosure may be provided at a part other than the steering wheel 20 (e.g., at an instrument panel).

What is claimed is:

1. A detecting device comprising a detecting portion that detects contact of a person with a contacted body, the detecting portion including:
   an insulating body, the insulating body having a substantially rectangular, elongated sheet shape;
   an electrode, the electrode having a substantially rectangular, elongated sheet shape, being disposed at at least one side surface side of the insulating body, and being less extensible than the insulating body; and
   a plurality of positioning holes, the plurality of positioning holes being formed so as to penetrate the insulating body and the electrode, and the insulating body and the electrode being positioned by the plurality of positioning holes,
   wherein the plurality of positioning holes comprise
      a first positioning hole formed at one side in a longitudinal direction of the electrode and formed at one side in a width direction of the electrode, and
      a second positioning hole formed at another side in the longitudinal direction of the electrode and formed at another side in the width direction of the electrode.

2. The detecting device of claim 1, wherein:
   the electrode comprises a first electrode disposed at one side surface side of the insulating body, and a second electrode disposed at another side surface side of the insulating body, and
   each of the first and second positioning holes is formed in a portion of the first electrode that is further toward an outer side than the second electrode, and each of the first and second positioning holes is formed such that the first and second positioning holes penetrate the insulating body and the first electrode.

3. The detecting device of claim 2, wherein the plurality of positioning holes comprises a third positioning hole that is formed in a portion of the second electrode that is further toward an outer side than the first electrode and is also formed such that the third positioning hole penetrates the insulating body and the second electrode.

4. A steering wheel comprising:
   the detecting device of claim 1;
   a rim core on which the detecting portion is wound; and
   a decorative member covering the detecting portion wound on the rim core.

5. The detecting device of claim 1, wherein:
   the first positioning hole is formed in corner portions of the electrode and the insulating body;
   the second positioning hole is formed in other corner portions of the electrode and the insulating body; and the corner portions in which the first positioning hole is formed are diagonally opposite the corner portions in which the second positioning hole is formed.

\* \* \* \* \*